United States Patent
Filippov et al.

(10) Patent No.: US 11,206,394 B2
(45) Date of Patent: Dec. 21, 2021

(54) APPARATUS AND METHOD FOR CODING AN IMAGE

(71) Applicant: HUAWEI TECHNOLOGIES CO., LTD., Guangdong (CN)

(72) Inventors: Alexey Konstantinovich Filippov, Moscow (RU); Vasily Alexeevich Rufitskiy, Moscow (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/027,157

(22) Filed: Sep. 21, 2020

(65) Prior Publication Data

US 2021/0006779 A1 Jan. 7, 2021

Related U.S. Application Data

(63) Continuation of application No. PCT/RU2018/000181, filed on Mar. 22, 2018.

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 8,619,857 B2 | 12/2013 | Zhao et al. | |
| 8,902,980 B2 | 12/2014 | Kim et al. | |

(Continued)

FOREIGN PATENT DOCUMENTS

| | | |
|---|---|---|
| WO | 2012088211 A1 | 6/2012 |
| WO | 2019009751 A1 | 1/2019 |
| WO | 2019083394 A1 | 5/2019 |

OTHER PUBLICATIONS

Jani, Lainema et al., "Chapter 4 Intra-Picture Prediction in HEVC" In: "High Efficiency Video Coding (HEVC)", Aug. 1, 2014 (Aug. 1, 2014, Springer International Publishing, XP55292569, ISBN: 978-3-319-06894-7 vol. 29, pp. 91-112, DOI:1-. 1007/978-3-319-06895-4_4 (Year: 2014).*

(Continued)

*Primary Examiner* — Lindsay J Uhl
(74) *Attorney, Agent, or Firm* — Fish & Richardson P.C.

(57) ABSTRACT

Methods, systems, devices, and apparatus for image processing are provided. In one aspect, a method includes: intra-predicting a block of an image based on reference samples of the image, the reference samples being arranged in one or more reference sample sets each including a coherent set of reference samples and including one or more reference samples adjoining the block; segmenting each of the one or more reference sample sets into a sequence of three or more subsets including a first subset, a last subset, and one or more intermediary subsets located therebetween; determining a weight value for each subset, weight values of the one or more intermediary subsets being lower than weight values of the first subset and the last subset; fitting a plane to the reference samples of the image using the determined weight values; and generating an intra-predicted block based on the plane.

17 Claims, 10 Drawing Sheets

(51) Int. Cl.
*H04N 19/132* (2014.01)
*H04N 19/159* (2014.01)
*H04N 19/176* (2014.01)

(56) References Cited

U.S. PATENT DOCUMENTS 9,374,578 B1 6/2016 Mukherjee et al.
10,750,174 B2 * 8/2020 Lee .................. H04N 19/11
2013/0301717 A1 11/2013 Kim et al.

OTHER PUBLICATIONS

Lainema et al., "Chapter 4 Intra-Picture Prediction in HEVC", "High Efficiency Video Coding (HEVC)", Springer International Publishing, XP055292569, Aug. 1, 2014, 91-112, 22 pages.
Galpin et al.,"EE7 Adaptive Clipping in JEM3.0",Joint Video Exploration Team (JVET) of ITU-T SG 16 WP 3 and ISO/IEC JTC 1/SC 29/WG 11, JVET-D0033-r2, 4th Meeting: Chengdu, CN, Oct. 15-21, 2016, 10 pages.
Li et al., "Multiple line-based intra prediction",Joint Video Exploration Team (JVET) of ITU-T SG 16 WP 3 and ISO/IEC JTC 1/SC 29/WG 11, JVET-C0071, 3rd Meeting: Geneva, CH, May 26-Jun. 1, 2016, 6 pages.
Galpin et al.,"Adaptive Clipping in JEM2.0", Joint Video Exploration Team (JVET) of ITU-T SG 16 WP 3 and ISO/IEC JTC 1/SC 29/WG 11, JVET-C0040-r3, 3rd Meeting: Geneva, CH, May 26-Jun. 1, 2016, 7 pages.

Huang et al.,"EE2.1: Quadtree plus binary tree structure integration with JEM tools", Joint Video Exploration Team (JVET) of ITU-T SG 16 WP 3 and ISO/IEC JTC 1/SC 29/WG 11, JVET-C0024, 3rd Meeting: Geneva, CH, May 26-Jun. 1, 2016, 5 pages.
Chen et al.,"Algorithm Description of Joint Exploration Test Model 1" Joint Video Exploration Team (JVET) of ITU-T SG 16 WP 3 and ISO/IEC JTC 1/SC 29/WG 11 , JVET-A1001, 1nd Meeting: Geneva, CH, Oct. 19-21, 2015, 25 pages.
Sullivan et al., "Future video coding: Joint Exploration Model 1 (JEM1) for future video coding investigation", ITU-T SG16 Q6, TD 213 (WP 3/16), 20 pages.
ISO/IEC 23008-2:2013,"Information technology—High efficiency coding and media delivery in heterogeneous environments. Part 2: High efficiency video coding", Dec. 2013, 13 pages.
Sullivan et al.,"Overview of the High Efficiency Video Coding (HEVC) Standard", in IEEE Transactions on Circuits and Systems for Video Technology, vol. 22, No. 12, Dec. 2012,1649-1668, 20 pages.
ITU-T H.265(Feb. 2018), Series H: Audiovisual and Multimedia Systems Infrastructure of audiovisual services—Coding of moving video, High efficiency video coding, Feb. 2018, 692 pages.
ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017, 812 pages.
PCT International Search Report and Written Opinion in International Application No. PCT/RU2018/000,181, dated Jan. 2, 2019, 12 pages.

* cited by examiner

Spatial partitioning

A combination of quad-trees and binary trees used for coding a spatial partitioning

APPARATUS AND METHOD FOR CODING AN IMAGE

CROSS-REFERENCE TO RELATED APPLICATIONS

This application is a continuation of International Application No. PCT/RU2018/000181, filed on Mar. 22, 2018, the disclosure of which is hereby incorporated by reference in its entirety.

FIELD

The present disclosure relates to the field of image coding. Particularly, the disclosure relates to improving prediction of a block in an image.

BACKGROUND

Image compression and coding has been an important part of image processing for a long time. The reason for this is that an image includes typically a large amount of data and transport media have always had their limitations. Thus, there has been a need to compress images so that they require less space. In some of the compression methods the data is pre-processed for better compression. It is common that the pre-processing causes losing some details in the image. However, typically the change in detail is so small that the person viewing the image cannot detect the difference.

The advancement of cameras and viewing devices has increased the information content of images, and modern cameras are able to capture more details. Thus, resolutions are considerably larger than in the past. Furthermore, in addition to still images, videos are now part of everyday life. High resolution videos are particularly demanding for transport media. While the transport media have evolved as well, problems arise when more and more people wish to share high resolution images and videos.

In modern image and video coding methods the images are typically partitioned or split into partitions or blocks. Several partitioning methods have been introduced and in modern coding technologies partitions or blocks come in different sizes and shapes. The partitioning and desired sizes and shapes of resulting blocks may be performed by an encoder based on several criteria. Thus, one image is typically split into blocks of different shapes and sizes.

In decoding, the content of each block may be processed independently and there are several possibilities for deriving the content of a block. One of the possibilities is prediction which is commonly divided into two categories. In intra-prediction the basic assumption is that the texture on a block is similar to the texture in the local neighborhood and can be predicted from there. Thus, intra-prediction may also be used for single still images. In the inter-prediction the basic assumption is that a significant part of the content does not change abruptly between pictures in a video sequence. Thus, the content of a block can be predicted based on another image in a video sequence. Typically after a prediction stage, transform coding is performed for a prediction error which is the difference between an original signal and its prediction.

Two categories mentioned above may be further divided into different practical implementations of prediction. For example, several different intra-prediction modes are known. Examples of these include vertical, horizontal, DC and planar modes. The modes used may be defined in standards on image and video coding. The coding mode is typically determined by the encoder.

Examples of video standards involving the principles mentioned above are H.264/AVC and HEVC/H.265. Video coding standards are under continuous development while there is always a need for improving the coding efficiency or reducing computational complexity. Improving the coding efficiency means increasing the compression ratio for a given image quality level or increasing the image quality at a given compression ratio.

SUMMARY

A system and method for coding an image is provided. The coding of one or more blocks in an image involves using a plane-based intra-prediction method. The plane is defined by reference samples that are divided into subsets. Subsets are then provided with weight values that may be defined so as to improve the coding efficiency or to reduce the computational complexity.

In an aspect an image processing apparatus comprising processing circuitry is disclosed. The processing circuitry is configured to intra-predict a block of an image based on reference samples of the image, wherein the reference samples are arranged in one or more reference sample sets, wherein each of the reference sample sets is a coherent set of reference samples and comprises one or more reference samples adjoining the block. The set is coherent in a topological sense, i.e. the samples in the respective set are spatially connected to each other via samples of the same set. The processing circuitry is further configured to: segment each of one or more of the reference sample sets into a sequence of three or more subsets, wherein the sequence consists a first subset, a last subset and one or more intermediary subsets located between the first subset and the last subset. For each subset, the processing circuitry is configured to determine a weight value, wherein weight values of the one or more intermediary subsets are lower than the weight values of the first subset and the last subset. The processing circuitry is further configured to fit a plane to the reference samples using the determined weight values; and generate an intra-predicted block based on the plane (e.g., by using points of the plane as samples of the intra-predicted block).

Assigning different weight values for reference sample subsets can improve the prediction quality of a predicted image block. At a given code rate, the better prediction improves image quality and provides better user experience.

In an implementation of the aspect the processing circuitry is configured to determine the weight values for the subsets so as to reduce discontinuities between the block and one or more adjoining blocks of the image. When the weight values are determined to reduce discontinuities between the block and one or more adjoining blocks the image quality is improved as continuity is better.

In an implementation of the aspect, the processing circuitry is configured to determine the weight values of the subsets based on the spatial distribution of the reference samples. Using the spatial distribution when determining weight values is beneficial as the discontinuities and other drawbacks in the image quality are also spatially distributed along edges of the block. When the weight values are adjusted according to the spatial distribution local environments are improved by taking the differences within blocks into account.

In an implementation of the aspect, the reference samples adjoin the block. It is beneficial to use reference samples adjoining the block as they provide relevant reference for prediction. In another implementation of the aspect the reference samples include reference samples which do not adjoin the block and the processing circuitry is further configured to determine the weight values based on the distances between the reference samples and the block. In some conditions it is beneficial to use reference samples that do not adjoin the block as their information may be used in improving the prediction. In an implementation of the aspect the reference samples are arranged in multiple lines. It is beneficial to be able to use more than one line of reference samples. The segmentation into subsets can be performed involving several lines.

In an implementation of the aspect, the processing circuitry is further configured to determine weight values in accordance with a spatial error distribution of reference samples that are samples of a neighboring block. It is beneficial to use reference samples belonging to neighboring block so that the subsets extend to the area of the neighboring block. This increases prediction quality, and thus the coding efficiency, when diagonal plane-based prediction is involved.

In an implementation of the aspect, the image processing apparatus is a decoding apparatus or an encoding apparatus. The decoding or encoding apparatus may be implemented in, e.g., a mobile phone, a tablet computer, a computer or similar.

In an implementation of the aspect, the apparatus is configured to partition the image so that the number of reference samples on one or more edges of partitioned blocks is a power of two. This reduces computational complexity as division operations can be replaced by binary shift operations.

In a second aspect, an image coding method is disclosed. The method comprises intra-predicting a block of an image based on reference samples of the image, wherein the reference samples are arranged in one or more reference sample sets, wherein each of the reference sample sets is a coherent set of reference samples and comprises one or more reference samples adjoining the block. The method further comprises segmenting each of one or more of the reference sample sets into a sequence of three or more subsets, wherein the sequence consists a first subset, a last subset and one or more intermediary subsets located between the first subset and the last subset. In the method, for each subset, determining a weight value, wherein weight values of the one or more intermediary subsets are lower than the weight values of the first subset and the last subset. The method further comprises fitting a plane to the reference samples using the determined weight values; and generating an intra-predicted block by using points of the plane as samples of the intra-predicted block.

Assigning different weight values for reference sample subsets provides possibility to improve the prediction result quality of a predicted image block. The better prediction improves image quality and provides better user experience.

In an implementation of the second aspect, the method further comprises determining weight values for the subsets in order to minimize discontinuities between blocks. When the weight values are determined to reduce discontinuities between the block and one or more adjoining blocks the image quality is improved.

In an implementation of the second aspect, the method further comprises determining the weight values of the subsets based on the spatial distribution of the reference samples. Using the spatial distribution when determining weight values is beneficial as the discontinuities and other drawbacks in the image quality are also spatially distributed along edges of the block. When the weight values are adjusted according to the spatial distribution local environments are improved by taking the differences within blocks into account.

In an implementation of the second aspect, the reference samples adjoin the block. It is beneficial to use reference samples adjoining the block as they provide relevant reference for prediction. In an implementation of the second aspect the reference samples include reference samples which do not adjoin the block and the method further comprises: determining the weight values at least partially based on distances between reference samples and the block. In some conditions it is beneficial to use reference samples that do not adjoin the block as their information may be used in improving the prediction. In an implementation of the second aspect the reference samples are arranged into multiple lines. It is beneficial to be able to use more than one line of reference samples. The segmentation into subsets can be performed involving several lines.

In an implementation of the second aspect, the method is further comprises determining weight values in accordance with spatial error distribution within reference samples, which reference samples are samples of the neighboring block. The arrangement disclosed above may be used in an image decoding apparatus or in an image decoding apparatus so that the arrangement may be used in different type of devices, such as mobile phones, tablet computers, computers and similar.

In an implementation of the second aspect, the image is partitioned so that the number of reference samples on one or more edges of partitioned blocks is a power of two. This reduces computational complexity as division operations can be replaced by binary shift operations.

In a third aspect, the method described above is implemented as a computer program comprising computer program code that causes the method when the computer program is executed on a computing device. It is particularly beneficial to implement the method as a computer program as it can easily be executed in different computing devices.

The aspects and implementations disclosed above are beneficial in general as they improve the video coding efficiency. This provides better use of capacity of existing devices and the user experience can be improved.

DESCRIPTION OF THE DRAWINGS

The present description will be better understood from the following detailed description read in light of the accompanying drawings, where.

DETAILED DESCRIPTION

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims. In the following description decoding is discussed, however, a corresponding encoder includes a similar decoder part.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. Instead of the term picture the terms image or frame may be used/are used synonymously in the field of video coding. Each picture is typically partitioned into a set of non-overlapping blocks. The encoding/coding of the video is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block (video block) for representation.

In the following description a video coding apparatus, a method and a corresponding computer program are disclosed.

Figure 1:
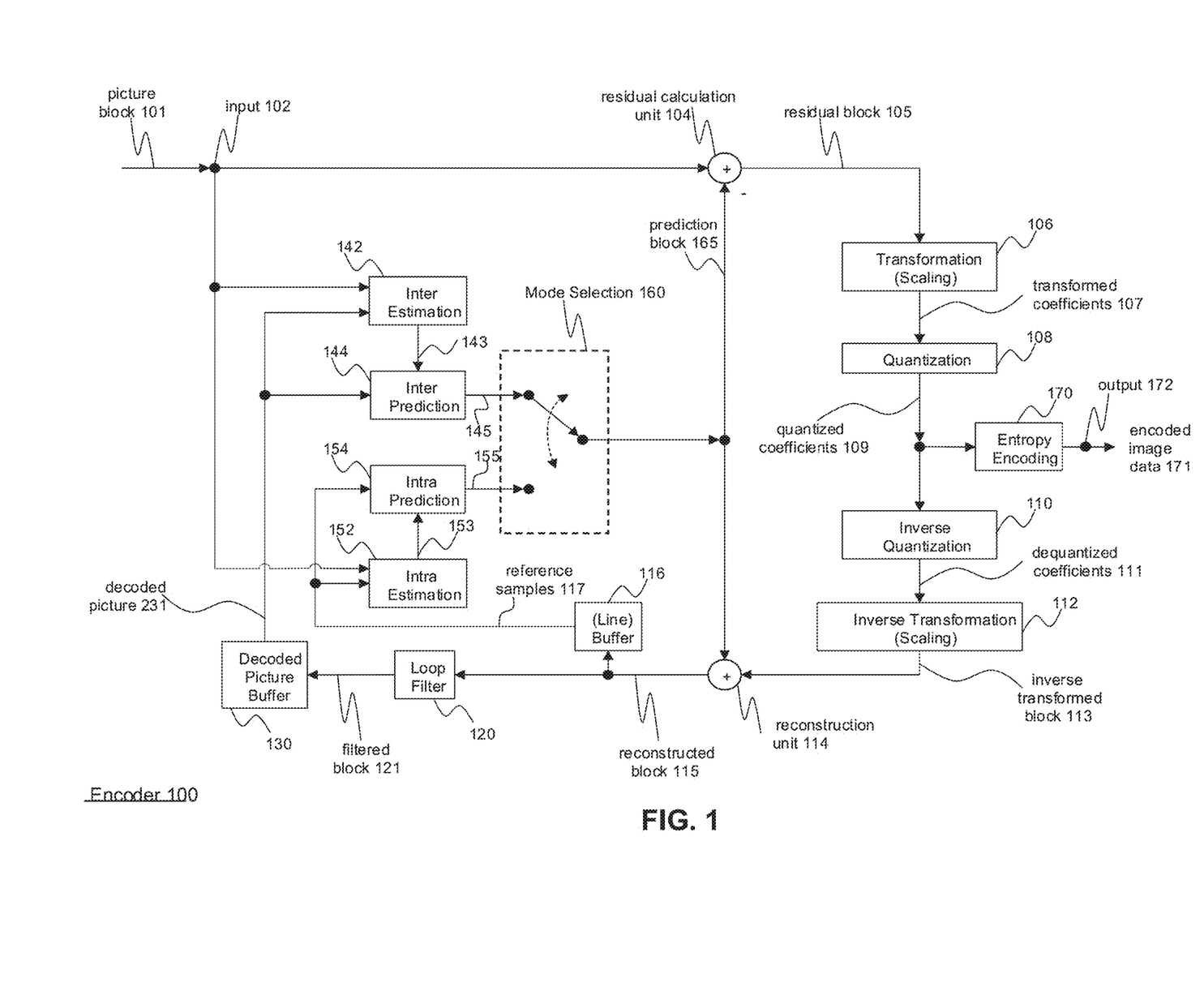
FIG. 1 illustrates an example of an image encoder.

FIG. 1 shows an example of a video encoding apparatus (encoder) 100, which comprises an input 102, a residual calculation unit 104, a transformation unit 106, a quantization unit 108, an inverse quantization unit 110, an inverse transformation unit 112, a reconstruction unit 114, a loop filter 120, a frame buffer 130, an inter estimation unit 142, an inter prediction unit 144, an intra estimation unit 152, an intra prediction unit 154, a mode selection unit 160, an entropy encoding unit 170, and an output 172.

The input 102 is configured to receive a picture block 101 of a picture (e.g., a still picture or picture of a sequence of pictures forming a video or video sequence). The picture block may also be referred to as current picture block or picture block to be coded, and the picture as current picture or picture to be coded.

The residual calculation unit 104 is configured to calculate a residual block 105 based on the picture block 101 and a prediction block 165 (further details about the prediction block 165 are provided later), e.g., by subtracting sample values of the prediction block 165 from sample values of the picture block 101, sample by sample (pixel by pixel) to obtain a residual block in the sample domain.

The transformation unit 106 is configured to apply a transformation, e.g., a discrete cosine transform (DCT) or discrete sine transform (DST), on the residual block 105 to obtain transformed coefficients 107 in a transform domain. The transformed coefficients 107 may also be referred to as transformed residual coefficients and represent the residual block 105 in the transform domain.

Mode selection unit 160 may be configured to perform inter estimation/prediction and intra estimation/prediction (or rather control the inter estimation/prediction and intra estimation/prediction) and to select a reference block and/or prediction mode (intra or inter prediction mode) to be used as prediction block 165 for the calculation of the residual block 105 and for the reconstruction of the reconstructed block 115. The prediction mode may be chosen to be intra prediction and the block may be predicted using planar-based intra-prediction mode, for example. Correspondingly, the prediction mode may be chosen to be inter prediction and the block may be predicted using planar-based inter-prediction mode, wherein reference samples used to determine the plane are taken from a different image.

The intra prediction unit 154 is configured to determine the intra prediction block 155 based on the intra prediction parameter 153, e.g., the selected intra prediction mode 153.

Although FIG. 1 shows two distinct units (or steps) for the intra-coding, namely intra estimation 152 and intra prediction 154, both functionalities may be performed as one. Intra estimation comprise calculating the intra prediction block, i.e. the or a "kind of" intra prediction 154), e.g., by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The inter prediction unit 144 is configured to receive an inter prediction parameter 143 and to perform inter estimation based on/using the inter prediction parameter 143 to obtain an inter prediction block 145.

More specifically, the video encoding apparatus 100 may be configured to encode video using a plane-based prediction for one or more blocks in an image. The video encoding apparatus comprises a processor (or a set of processors) that is configured to apply planar-based prediction according to the principles described below. The planar-based prediction is done for a video stream or similar encoded sequence of images received by the processor. The receiving may be done using commonly known means, such as receiving from a bus, internal or external memory, network connection or similar. Furthermore, after receiving the video, the processor is configured to extract image frames from the received video. The extracted image frames are then processed before it is shown to a viewer.

Figure 2:
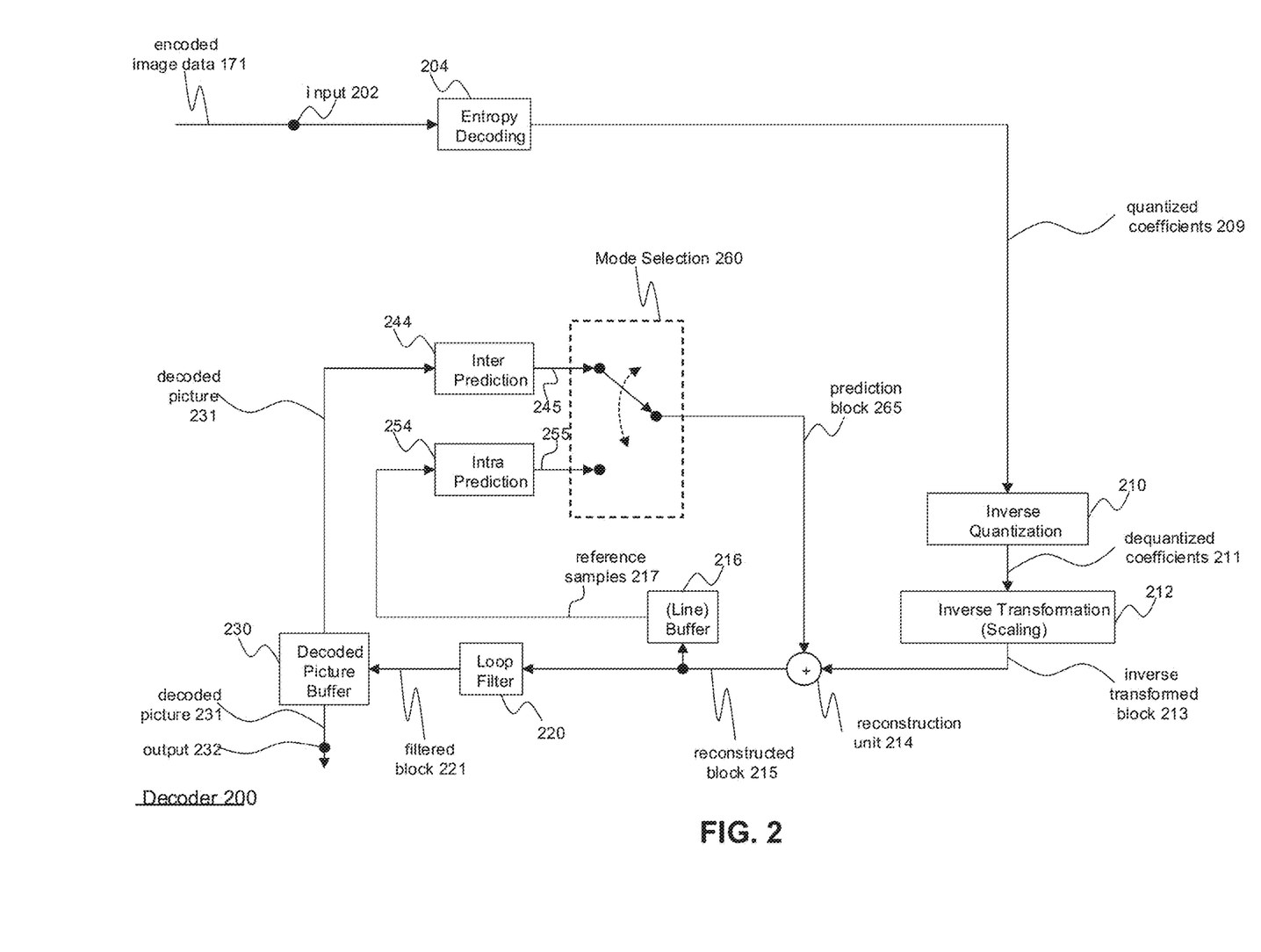
FIG. 2 illustrates an example of an image decoder.

FIG. 2 shows an example of a video decoder 200 configured to receive encoded picture data (bitstream) 171, e.g., encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, an inter prediction unit 244, an intra prediction unit 254, a mode selection unit 260 and an output 232. Correspondingly with the encoder of FIG. 1, the mode selection unit may choose an intra-prediction mode (e.g., a plane-based intra-prediction mode) or an inter-prediction mode that is applied in accordance with the principles discussed below.

FIG. 2 illustrates an example of a method which may be performed by a video coding apparatus such as the video coding apparatus of FIG. 1. Although, in the following example, the method is described as a sequential process, some of the steps may and are typically executed in parallel, as the decoding of a video is continuous. In the example, a video comprising a plurality of encoded image frames is received in decoder 200. The receiving may be done using any suitable receiving means or by retrieving from a memory. The video coding apparatus receiving the image frames may be any device capable of displaying such video. As mentioned above, the video is extracted into image frames that are later shown to a viewer frame by frame. Later in this description, when a plurality of image frames is referred to, image frames extracted from the received video are meant.

Figure 3:
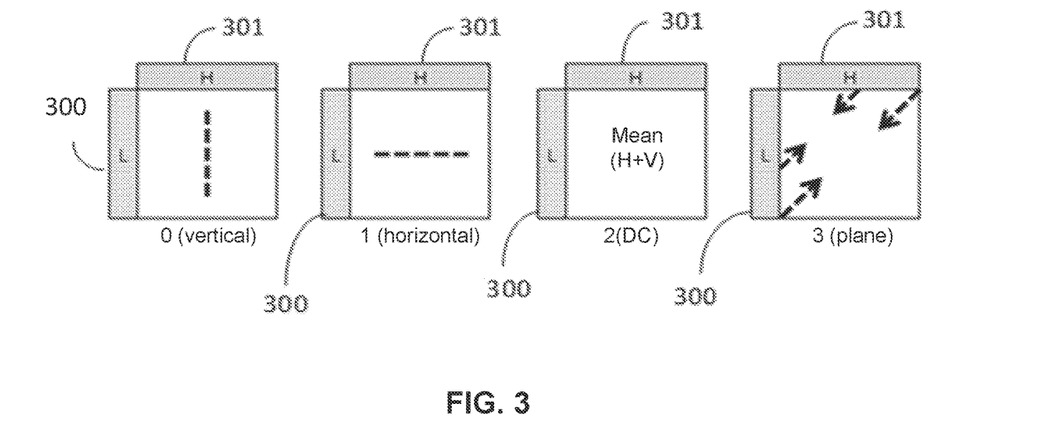
FIG. 3 illustrates examples of different prediction modes.

In the following examples it is assumed that the partitioning into blocks has already been performed using a suitable partitioning. For better understanding of the examples, FIG. 3 illustrates different intra-prediction modes, wherein mode 3 is plane-based prediction. Vertical, Horizontal and DC prediction modes are shown for illustrative purposes only. In FIG. 3 reference samples are arranged in a horizontal set 300 and a vertical set 301. However, similar principles may be used with diagonal splitting boundaries if they allow defining a plane. While FIG. 3 shows reference sample sets on the left and top boundaries, it is possible to define a plane using any combination of two, three or four boundaries. For example, a plane can be defined by using two horizontal reference sample sets, or two vertical and one horizontal sample set.

Figure 4:
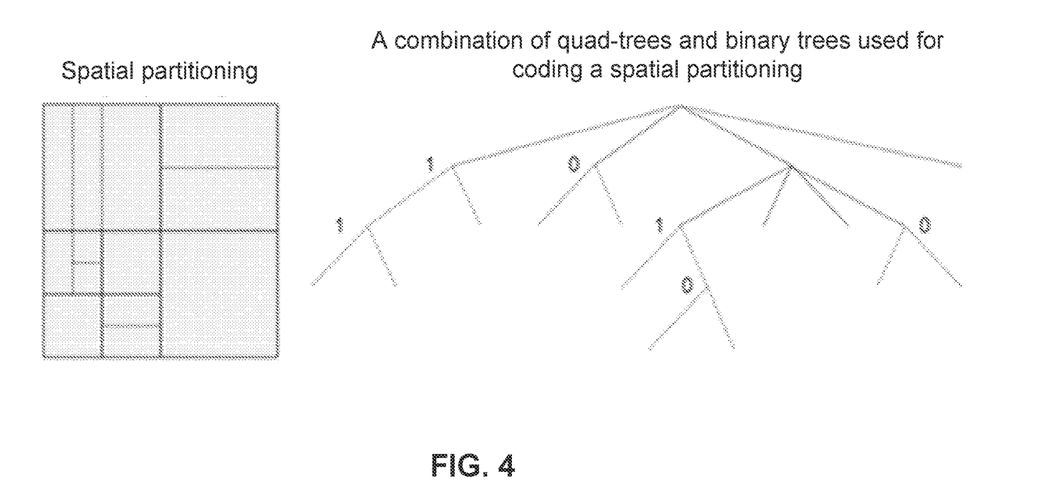
FIG. 4 illustrates an example of image partitioning.

FIG. 4 illustrates an example of a partitioning method based on both quad-tree and binary tree partitioning and known as QTBT partitioning. As depicted in FIG. 4, QTBT partitioning can provide not only square but rectangular blocks as well. QTBT is provided only as an example and also other partitioning methods may be used. For example, it is possible to use asymmetrical partitioning, wherein the sizes and shapes of blocks vary even more than in the example of FIG. 4.

With the basic setting of, e.g., FIG. 3 and FIG. 4, an image has been partitioned into several blocks and a plane-based prediction mode has been chosen. In the following, examples that may be used for increasing the coding gain will be described. The examples involve dividing reference samples into subsets. Reference samples are arranged into two sets, such as a horizontal and a vertical set. This is further illustrated by the following examples. In the examples one or more sets are then partitioned into subsets, and weight values are assigned to the subsets.

The image is preferably partitioned so that the number of reference samples on one or more edges of partitioned blocks is a power of two. This reduces computational complexity as division operations can be replaced by binary shift operations. Thus, a square block could comprise 16 samples on each edge and a rectangular block 8 in a horizontal set and 16 samples in a vertical set. The actual numbers mentioned here are just examples and also other numbers may be used, provided that they are power of two. Even if choosing the number of samples as a power of two is beneficial, the method and arrangement for determining weights works also with other numbers.

Figure 5:
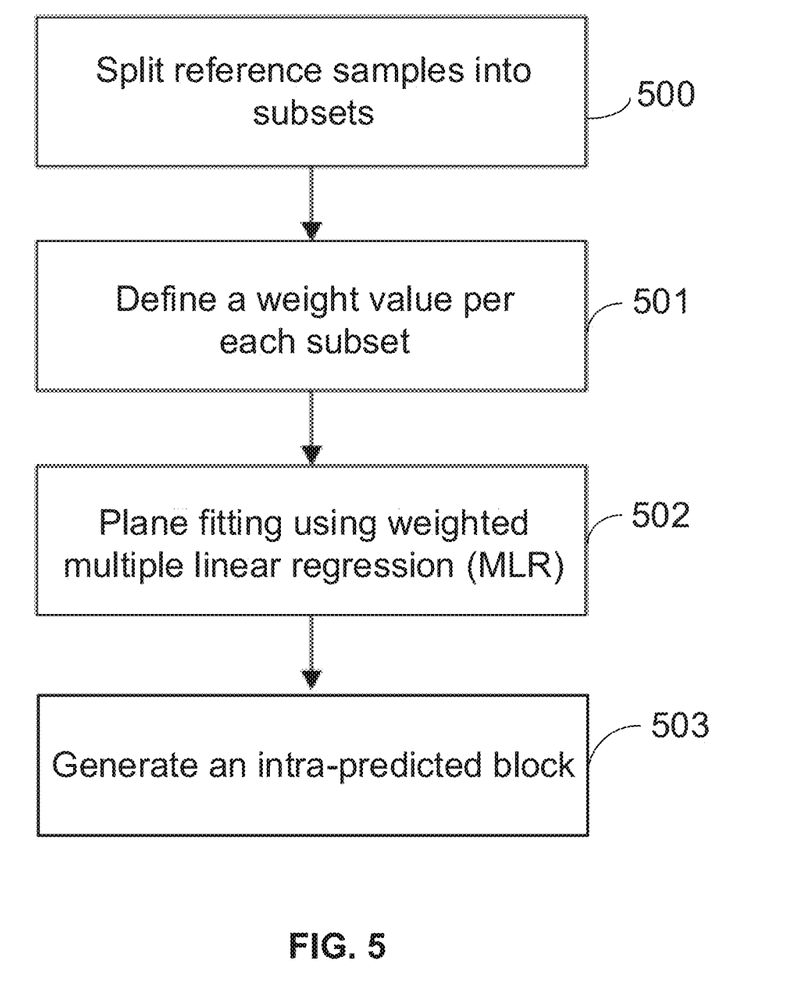
FIG. 5 illustrates an example of a prediction mode using plane fitting.

FIG. 5 discloses a flow chart according to an example according to a video coding method. In the example of FIG. 5 the initial step, 500, comprises defining subsets of reference samples. Basically, division into subsets is performed to compensate for a difference in reliability of reference samples. The subsets may be defined in such a manner that samples having similar reliability are grouped in the same subset. The term "reliability" herein and further is defined as the probability that pixels predicted from these reference samples have small prediction error, i.e. the smaller predictor error is, the more reliable the reference samples are.

Figure 6:
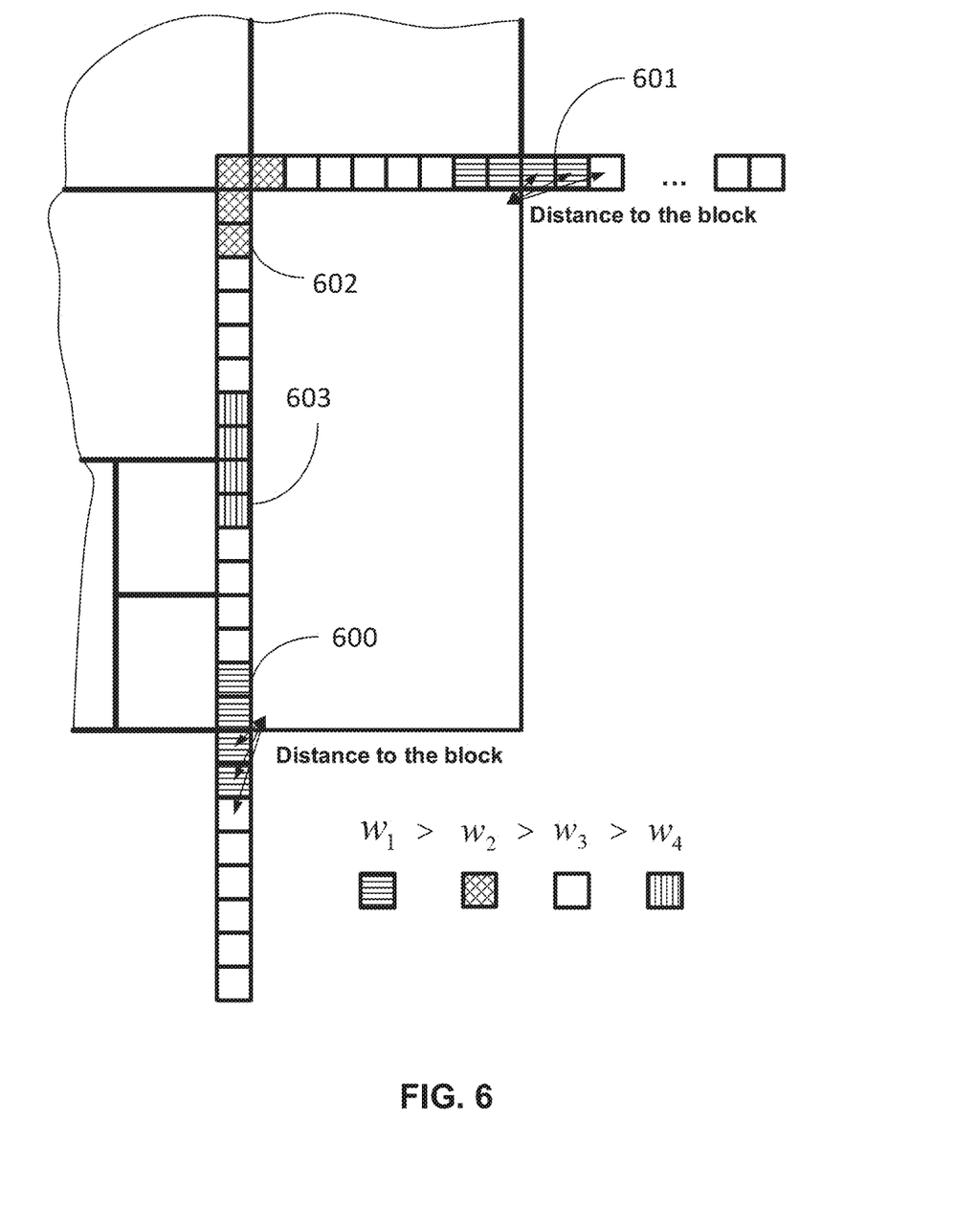
FIG. 6 illustrates reference samples and segmentation to subsets.

FIG. 6 illustrates examples of subsets (e.g., as defined in step 500). The degree of reliability of a reference sample may correlate with one or more of the following: the position of the reference sample within the block that comprises the respective reference sample; the position of the reference sample position relative to the block to be predicted; the distance of the reference sample to the boundary of the block to be predicted (if the reference sample does not adjoin the block to be predicted); and the aspect ratio of the block to be predicted. In the shown example (still referring to FIG. 6), four subsets 600, 601, 602, 603 are defined. These subsets include a first subset 600 and a last subset 601. They further include a subset 602 located near a corner (in the shown example, the top left corner) of the block to be predicted. The first and last subsets 600, 601 each have a weight value $w_1$. The subset 602 has a weight value $W_2$ which is less than the weight value $w_1$ of the first and last subsets. Furthermore, the weight value $W_2$ is greater than the weight value $W_3$ that is assigned to samples located between the subsets 600, 601, 602, 603. The weight value $w_3$ is larger than the weight value $W_4$ that is assigned to the subset 603. The determination of actual weights is explained in more detail with reference to FIG. 10.

The next step, 501, is to define a weight value for each of the subsets. By specifying weight values it is possible to control the impact of subsets on the plane-based prediction.

In step 502, a plane-based prediction signal is generated using the specified weight values, step 502. This may be achieved, for example, by applying multiple linear regression (MLR) using a least-square fitting method that minimizes the following quantity:

$$F = \sum_i w_i (p_i - ax_i - by_i - c)^2 \rightarrow \min$$

where a, b, and c are parameters defining a plane in the space of coordinates x, y, and p, wherein x and y are Cartesian coordinates of the image plane and p is an intensity coordinate.

In step 503, an intra-predicted block is generated based on the plane-based prediction signal, e.g., by adding the plane-based prediction signal and a residual signal.

Figure 7:
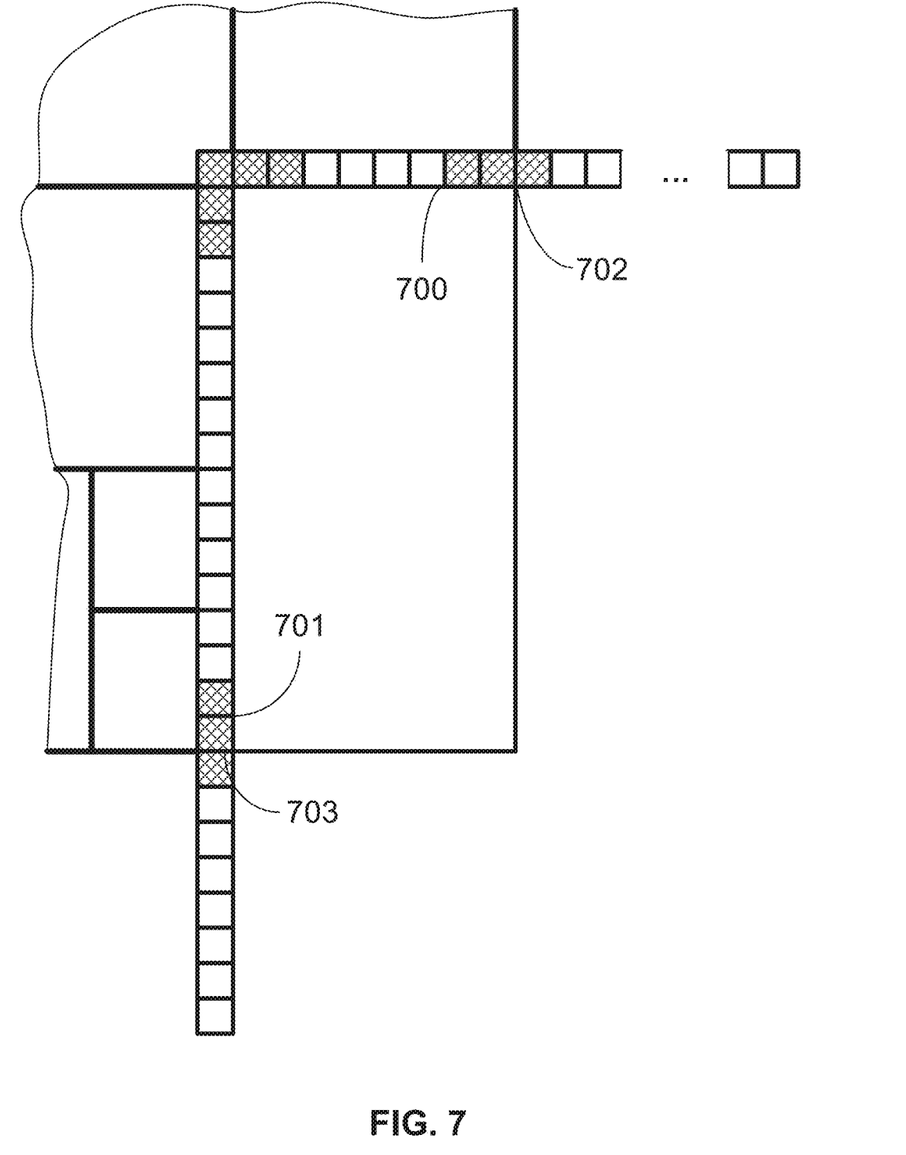
FIG. 7 illustrates reference samples near a block boundary.
Figure 8:
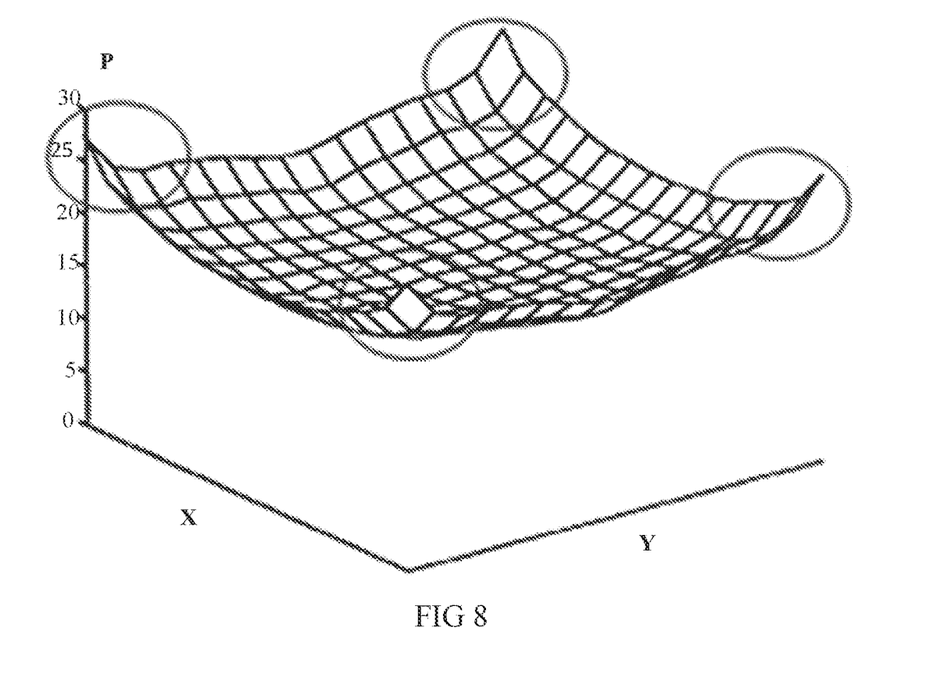
FIG. 8 illustrates a typical error distribution within a block.

In the following, criteria used to assign reference sample weights are discussed in more detail. The position of a reference sample within a block correlates with the reliability of the respective reference sample. Error values tend to depend on the positions of the reference samples, e.g., as shown in FIG. 8. The positions of the reference samples relative to the block to be predicted can have an effect on both objective and subjective performance in video coding, especially, in the case of using a plane-based predictor. For example, in some cases, rather than maximizing the objective coding performance, it may be more important to minimize discontinuities between the block and its neighboring blocks (mainly, below and on the right side) to improve their subjective quality. When the discontinuities are to be minimized, the weight values of reference sample subsets 700, 701 located near corners 702, 703 of the block should be increased as shown in FIG. 7.

Generally, a reference pixel located close to (e.g., adjoining) the block to be predicted will be more reliable for the prediction than a reference pixel located further away from the block to be predicted.

Figure 9:
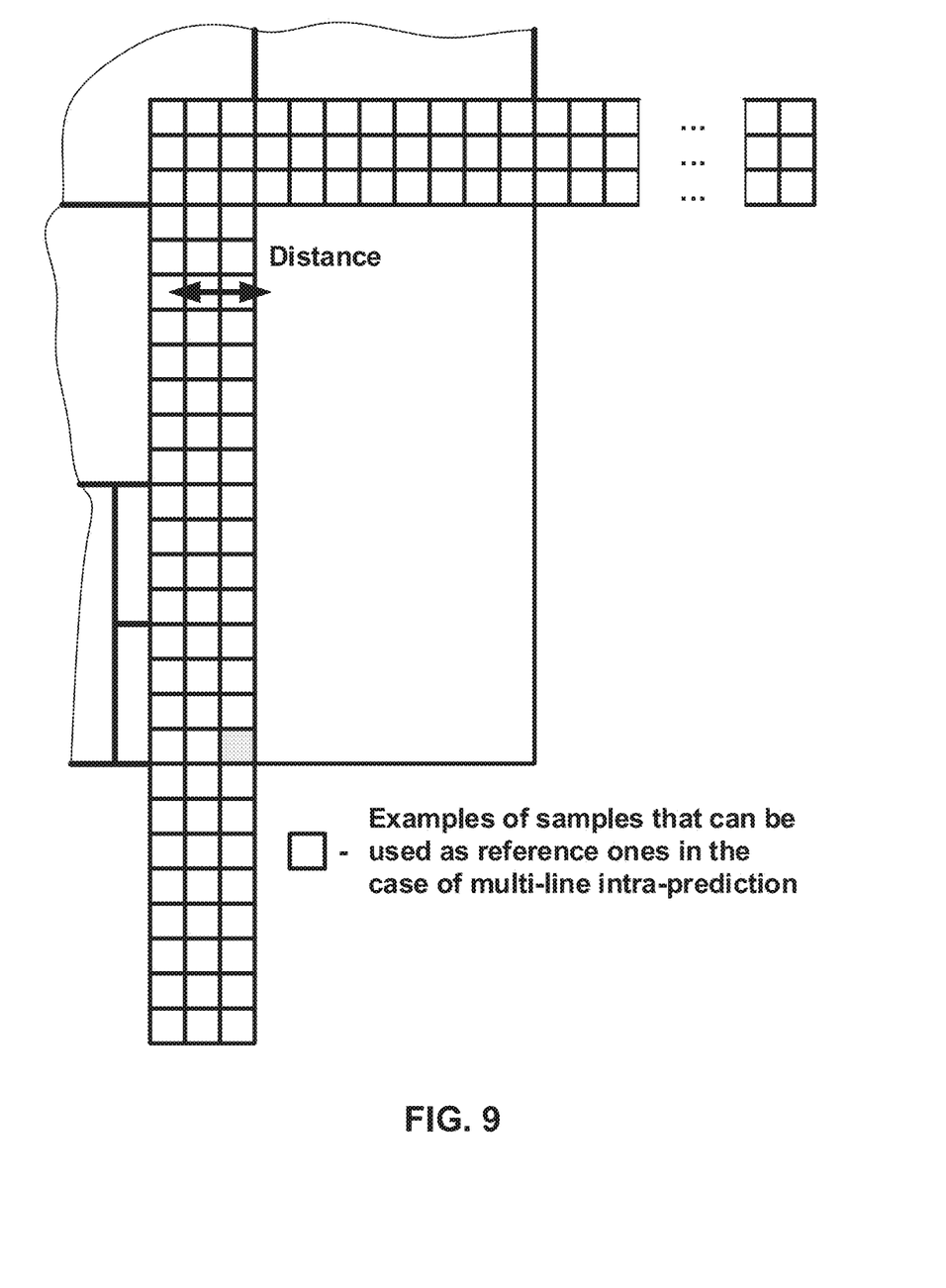
FIG. 9 illustrates reference samples arranged in multiple lines.

In FIG. 9 a further example using a multi-line intra-prediction mechanism is illustrated.

Figure 10:
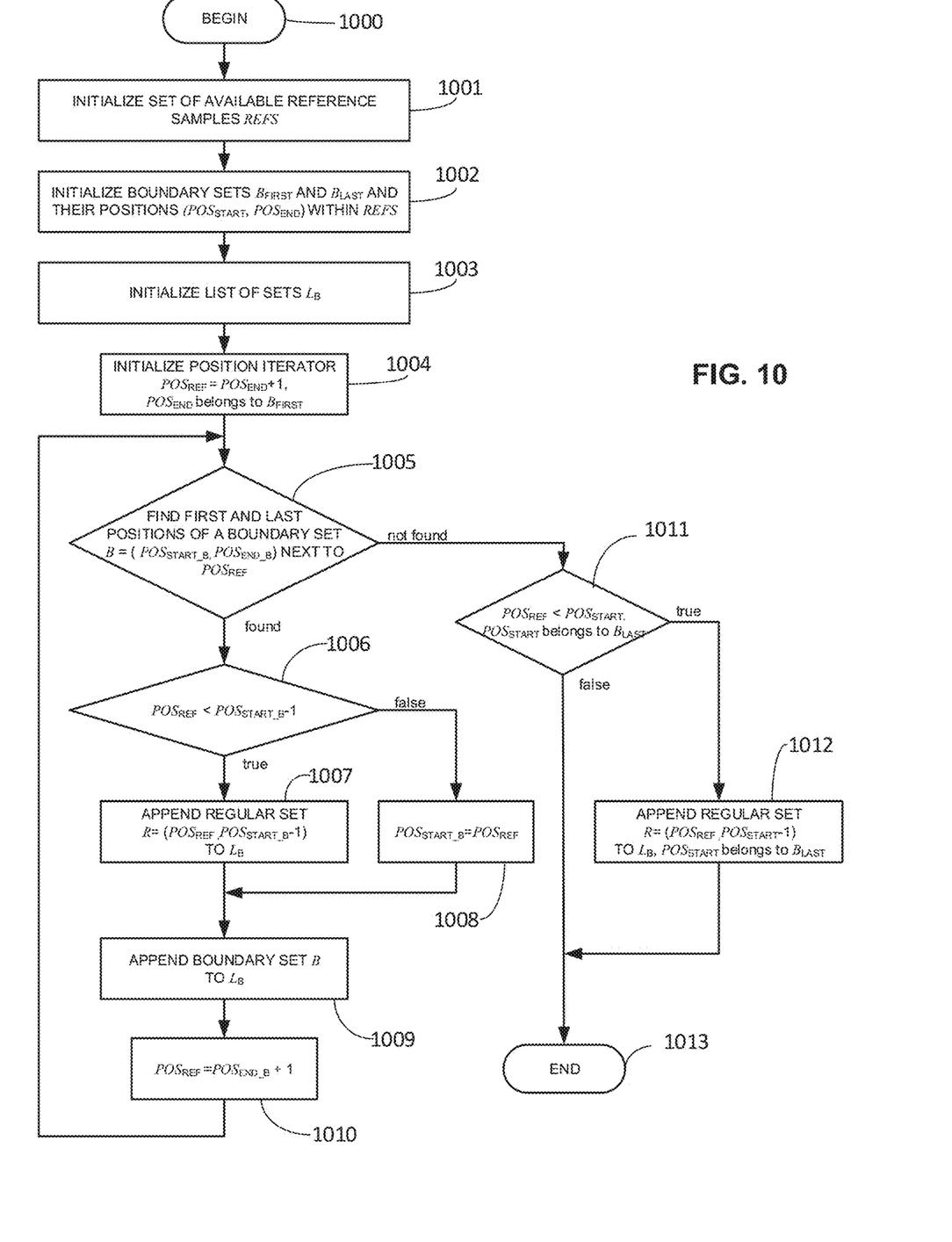
FIG. 10 illustrates an example of a method for deriving weights.

In FIG. 10 an example of a method of deriving weight values is disclosed. The example of FIG. 10 is one of the possible ways to derive weight values for a given set of reference samples and other similar methods may be used. FIG. 11 is used in the following discussion of FIG. 10 for providing better understanding of different conditions.

The basic idea behind this algorithm lies in retrieval of partitioning information about neighboring blocks along the boundary of the block to be predicted and segmenting reference samples into a first subset, a last subset and intermediary subsets located between the first subset and the last subset. The number of intermediary subset may vary among different implementation forms. In the following the first set and the last set are referred to as boundary sets as they are in the boundaries of the sequence of subsets.

In the beginning of the method the two boundary sets do not depend on the neighboring block partitioning. Each of the two boundary sets may be located near a respective corner of the block to be predicted. For these two initial boundary sets a largest value of weight is assigned, step 1000.

Figure 11A:
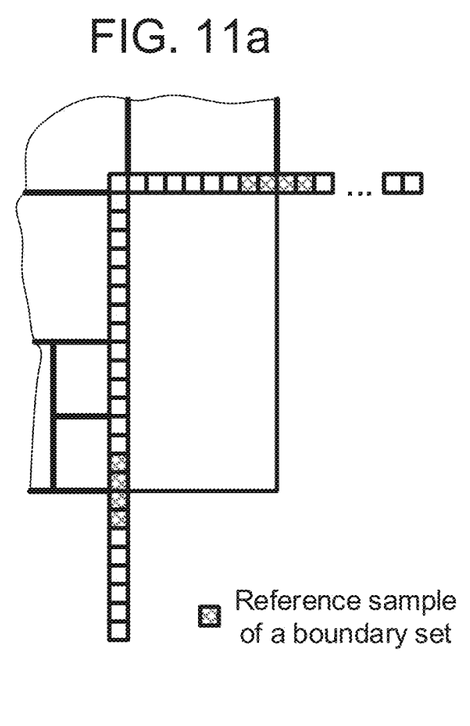
FIGS. 11a to 11c illustrate examples of defining a set of reference samples.

Depending on availability of neighboring blocks either one or two sets of reference samples could be specified for a block to be predicted. If two sets of reference samples are specified, then the algorithm shown in FIG. 10 is performed individually for each of the set. Particularly, the need to process more than one set of reference samples occurs when available neighboring blocks are not adjacent to each other, as shown in the example of FIG. 11c.

Processing of a reference samples' set starts by initialization of a general set of reference samples (denoted as REFS) used to predict a block, step 1001. Reference samples of this set are aligned with the boundaries of the block being coded. This alignment depends on the availability of neighboring blocks. A neighbor block is considered to be available if it was reconstructed prior to the start of reconstruction of the block to be predicted. FIG. 11 represents several cases of neighboring block availability with the corresponding alignment of the sets of reference samples. If left and upper blocks are available (case FIG. 11a), set of boundary reference samples are defined to be adjacent to top-right and bottom-left corners of the block to be coded. If right and top blocks are available, this set is defined similarly, but other two corners are selected: bottom-right and top-left ones. This case could be illustrated by mirroring case of FIG. 11a horizontally.

FIG. 11 represents several cases of neighboring block availability with the corresponding alignment of the sets of reference samples. If left and upper blocks are available (case FIG. 11a), set of boundary reference samples are defined to be adjacent to top-right and bottom-left corners of the block to be coded. If right and top blocks are available, this set is defined similarly, but other two corners are selected: bottom-right and top-left ones. This case could be illustrated by mirroring case of FIG. 11a horizontally.

Figure 11B:
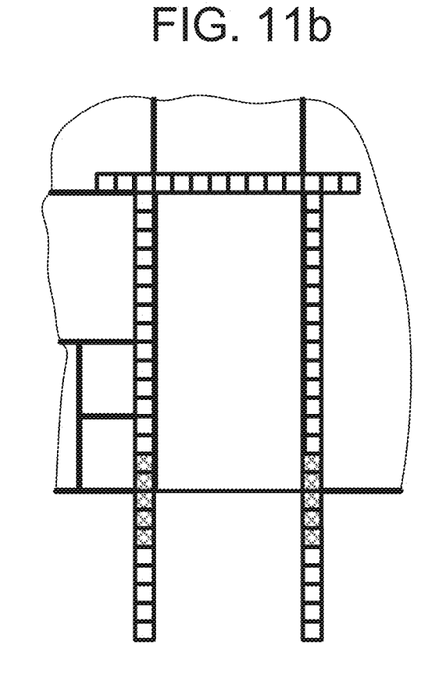
Figure 11C:
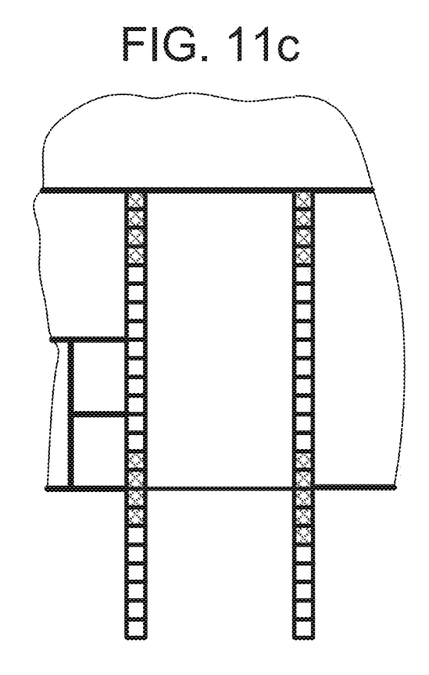

In the other case when three sides of the block are available, its bottom-left and bottom-right corners are selected to define a set of boundary reference samples as it is shown in FIG. 11b.

When available neighboring blocks are not adjacent, reference samples set comprises pixels aligned with only one of the sides of a block to be predicted (FIG. 11c). As described above, two sets of reference samples are specified (left-side and right-side one), each of these sets being processed individually. For the left-side set of reference samples a boundary set reference samples are aligned with top-left and bottom-left block corners. The second (right-side) set of reference samples uses corresponding opposite (right) side corners to define a set of boundary reference samples.

Each of the initial boundary sets of reference samples could be defined by two index values within a scan of reference samples starting clockwise or counterclockwise along the perimeter of the block to be predicted, step 1002. These index values denote start and end positions, i.e. positions of the first and the last reference sample belonging to a boundary reference sample set. Given an index $p_c$ of a reference sample that is adjacent to a relevant corner of a block to be predicted, a first index value of starting initial boundary set is defined as $POS_{START}=p_c-d_c$ and the second index value is defined as $POS_{END}=p_c+d_c-1$. The value of $d_0$ is a pre-defined parameter that determines a size of a boundary set. The ending boundary set is defined in a similar manner but with a different offset relative to $p_c$, specifically: $POS_{START}=p_c-d_c+1$, $POS_{END}=p_c+d_c$.

The algorithm of this embodiment uses lists of sets to define weight values. Other implementations that do not use lists are also possible. A next step, 1003, shown in FIG. 10, comprises initializing an empty list of sets and appending it with two boundary sets of reference samples that were defined at the previous step. After this list is initialized, a loop over reference samples starts by initializing an iterator value to the sample position that immediately follows the index of the starting boundary set, step 1004.

Termination condition for this loop is checked at the next step, 1005, of the algorithm. This condition is a result of search of a next set of boundary reference samples. The scope of the search is limited by the current position (iterator value) and the $POS_{START}$ index value of the ending boundary reference samples set.

This search operation, steps 1005-1013 could be performed in different ways. One of the approaches consist in finding a closest to position of a reference sample that is located at a boundary between two adjacent neighboring blocks and belongs to the block that is more distant to. Boundary set is derived from this position in a way similar to the one described above for initial boundary sets, but clipping operation is introduced to avoid intersection between sets.

In the example of FIG. 10 the result of step 1005 determines the following steps. If the positions are found next to $POS_{REF}$ the method proceeds to step 1006, wherein a further comparison $POS_{REF}<POS_{START\_B}-1$ is performed. If the condition is false $POS_{START\_B}$ is set $POS_{REF}$, step 1008, after which the method proceeds to step 1009. If it is true, the intermediary set is appended to the list, step 1007. Then the method proceeds to step 1009, wherein the boundary set B is appended to the list. After this $POS_{REF}$ is set to value $POS_{END\_B}+1$, step 1010. Then the method returns to the comparison 1005.

In the comparison, if the positions are not found next to $POS_{REF}$, the method proceeds to step 1011, wherein it is compared if $POS_{REF}<POS_{START}$, and if $POS_{START}$ belongs to $B_{LAST}$. If both conditions are true the intermediary set is appended to the list $L_B$, after which the method proceeds to the end, step 1013. If the conditions are false the method proceeds directly to the end, step 1013.

As explained above, the arrangement for intra-predicting a frame may be implemented in hardware, such as the image coding apparatus as described above, or as a method. The method may be implemented as a computer program. The computer program is then executed in a computing device.

The video coding apparatus and method for providing a routing configuration has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. An image processing apparatus comprising:
   at least one processor; and
   a non-transitory computer-readable storage medium coupled to the at least one processor and storing programming instructions for execution by the at least one processor, wherein the programming instructions instruct the at least one processor to perform operations comprising:
      intra-predicting a block of an image based on reference samples of the image, wherein the reference samples are arranged in one or more reference sample sets, and each of the reference sample sets is a coherent set of reference samples and comprises one or more reference samples adjoining the block;
      segmenting each of the one or more reference sample sets into a sequence of three or more subsets, wherein the sequence of three or more subsets comprises a first subset, a last subset, and one or more intermediary subsets located between the first subset and the last subset;
      determining weight values of subsets of the reference samples of the image by determining a weight value for each subset in the sequence of three or more subsets corresponding to each of the one or more reference sample sets, wherein weight values of the one or more intermediary subsets are lower than weight values of the first subset and the last subset;
      fitting a plane to the reference samples of the image using the determined weight values of the subsets; and
      generating an intra-predicted block based on the plane.

2. The image processing apparatus of claim 1, wherein determining the weight values of the subsets comprises:
   determining the weight values for the subsets to reduce discontinuities between the block and one or more adjoining blocks of the image.

3. The image processing apparatus of claim 1, wherein determining the weight values of the subsets comprises:
   determining the weight values of the subsets based on a spatial distribution of the reference samples of the image.

4. The image processing apparatus of claim 1, wherein the reference samples of the image adjoin the block.

5. The image processing apparatus of claim 1, wherein the reference samples of the image comprise reference samples that do not adjoin the block, and
   wherein determining the weight values of the subsets comprises:
      determining the weight values of the subsets at least partially based on distances between the reference samples of the image and the block.

6. The image processing apparatus of claim 5, wherein the reference samples of the image are arranged in multiple lines.

7. The image processing apparatus of claim 1, wherein determining the weight values of the subsets comprises:
   determining the weight values of the subsets in accordance with a spatial error distribution of reference samples that are samples of a neighboring block.

8. The image processing apparatus of claim 1, wherein the image processing apparatus comprises at least one of a decoder or an encoder.

9. An image coding method, comprising coding an image, wherein coding the image comprises:
   intra-predicting a block of the image based on reference samples of the image, wherein the reference samples are arranged in one or more reference sample sets, and each of the reference sample sets is a coherent set of reference samples and comprises one or more reference samples adjoining the block;
   segmenting each of the one or more reference sample sets into a sequence of three or more subsets, wherein the sequence of three or more subsets comprises a first subset, a last subset, and one or more intermediary subsets located between the first subset and the last subset;
   determining weight values of subsets of the reference samples of the image by determining a weight value for each subset in the sequence of three or more subsets corresponding to each of the one or more reference sample sets, weight values of the one or more intermediary subsets are lower than the weight values of the first subset and the last subset;
   fitting a plane to the reference samples of the image using the determined weight values of the subsets; and
   generating an intra-predicted block based on the plane.

10. The image coding method of claim 9, wherein determining the weight values of the subsets comprises:
    determining the weight values for the subsets to minimize discontinuities between blocks.

11. The image coding method of claim 9, wherein determining the weight values of the subsets comprises:
    determining the weight values of the subsets based on the spatial distribution of the reference samples of the image.

12. The image coding method of claim 9, wherein the reference samples of the image adjoin the block.

13. The image coding method of claim 9, wherein the reference samples of the image comprise reference samples which do not adjoin the block, and
    wherein determining the weight values of the subsets comprises:

determining the weight values of the subsets at least partially based on distances between the reference samples of the image and the block.

14. The image coding method of claim 13, wherein the reference samples of the image are arranged into multiple lines.

15. The image coding method of claim 9, wherein determining the weight values of the subsets comprises:
determining the weight values of the subsets in accordance with a spatial error distribution within reference samples that are samples of a neighboring block.

16. The image coding method of claim 9, wherein coding the image comprises one of:
encoding the image by a plane-base intra-prediction, or
decoding the image by a plane-base intra-prediction.

17. A non-transitory computer-readable storage medium coupled to at least one processor and storing programming instructions for execution by the at least one processor, wherein the programming instructions instruct the at least one processor to perform operations comprising:
intra-predicting a block of an image based on reference samples of the image, wherein the reference samples are arranged in one or more reference sample sets, and each of the reference sample sets is a coherent set of reference samples and comprises one or more reference samples adjoining the block;
segmenting each of the one or more reference sample sets into a sequence of three or more subsets, wherein the sequence of three or more subsets comprises a first subset, a last subset, and one or more intermediary subsets located between the first subset and the last subset;
determining weight values of subsets of the reference samples of the image by determining a weight value for each subset in the sequence of three or more subsets corresponding to each of the one or more reference sample sets, wherein weight values of the one or more intermediary subsets are lower than weight values of the first subset and the last subset;
fitting a plane to the reference samples of the image using the determined weight values of the subsets; and
generating an intra-predicted block based on the plane.

* * * * *